Sept. 4, 1928.
L. T. BIEGLER
AUTOMOBILE LIFTER
Filed April 11, 1927
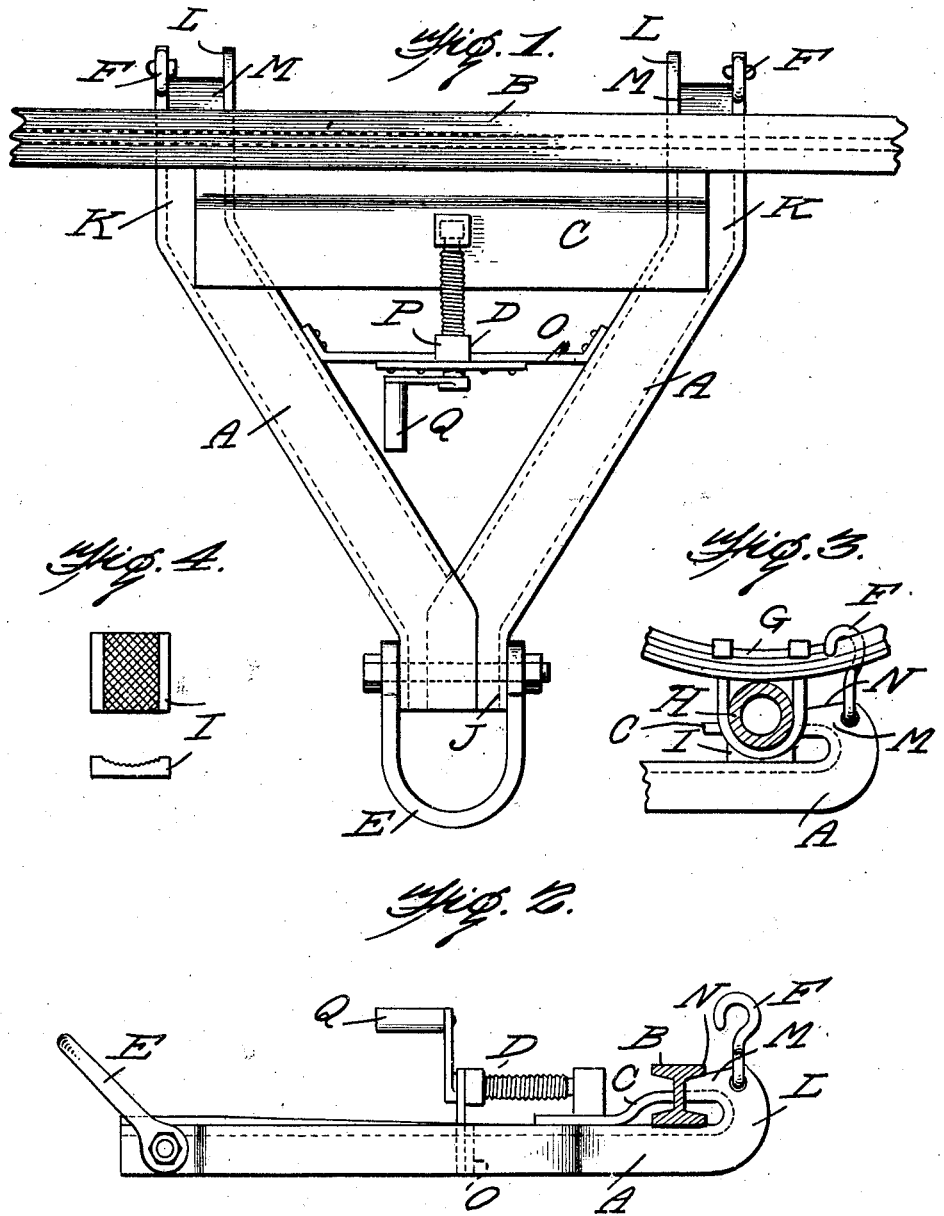

Patented Sept. 4, 1928.

1,683,020

UNITED STATES PATENT OFFICE.

LOUIS T. BIEGLER, OF ABERDEEN, SOUTH DAKOTA.

AUTOMOBILE LIFTER.

Application filed April 11, 1927. Serial No. 182,901.

This invention relates to a lifting means designed for removable cooperation with a vehicle and permitting the connection of lifting or handling means for the vehicle at a point wholly beyond the vehicle parts and therefore in a manner to prevent possibility of injury to the vehicle or marring of its finish through the use of such lifting means.

The principal object of the present invention is the provision of a lifting element designed to directly cooperate with an axle of the vehicle or with an axle and spring to anchor one end of the lift with respect to the vehicle, the lift being projected beyond such axle and beyond the vehicle to provide for the convenient attachment of the lifting means.

The invention is illustrated in the accompanying drawings in which:

Figure 1 is a plan view showing the lifting element attached to a vehicle axle where the axle is of I-beam type.

Figure 2 is an edge view of the same, the axle being shown in section.

Figure 3 shows the cooperation of the lifter with a round axle.

Figure 4 is a plan and edge view of the bearing blocks used with the device when cooperating with a round or similar axle.

The improved lifter comprises in its preferred form a lifting member made up of two angularly related bars A which at their outer or meeting ends are provided with a pin J to receive a clevis E to which the power lifting mechanism may be conveniently attached. The inner ends of the bars A present short parallel sections K, the terminals of which are formed in return bends L with interfitting ends M, the upper edges of which are inclined, as at N.

A brace bar O connects the respective bars A intermediate their ends and is centrally provided with a threaded block P in which operates a threaded rod D actuated through the medium of a handle Q, as shown. The inner end of the threaded rod D carries a plate C which bridges the space between the parts K of the bars A and operates above said bars, as indicated in Figure 2.

The terminals L of the bars A are provided with hooks F for the use of the device with round or like axles as will appear later.

In the use of the lifter with axles of I-beam form, as indicated at B in Figures 1 and 2, the bars A are passed beneath the axle and the terminals M engaged in the channel of the axle from the rear. The inclined end N of the terminals M is such as to correspond with the inclination of the flange of the axle so as to bear snugly against the same when the bottom surface of the axle is engaged by the upper surface of the bars A. The handle Q is operated to cause the threaded rod D to force the locking plate C into contact with the front surface of the axle upright portion, thereby securely clamping the axle between the terminal end of locking plate C with the locking member prevented from tilting between the bearing of the inclined end against the axle flange and the broad bearing of the bars A upon the lower surface of the axle. The lifter is thus rigidly attached to the axle against liability of turning or twisting thereon and the power lifting means may be conveniently attached to the clevis E for lifting the connected end of the vehicle without liability of the chains or other lifting element coming in contact with any part of the vehicle with the consequent tendency of liability of injury or marring the finish of the vehicle.

Where the lifter is used with a round or like axle, it is, of course, apparent that the terminal M can have no cooperating function. Under these circumstances, the bars A are passed beneath the axle and the hook F engaged over the usual spring G to anchor the inner end of the lifter. Under these circumstances and to provide a proper bearing for the bars, bearing blocks I are interposed between the axle and the lifting bars A. These bearing blocks are shaped on their upper surfaces to conform to the shape of the axle and preferably roughened or serrated, as indicated, and are square on their lower surfaces to permit effective bearing cooperation with the bars A. After the lifter is thus applied, the locking plate C is, of course, positioned against the axle as previously described in order to maintain the cooperation of the parts, whereupon the lifter is anchored with respect to the axle and may be utilized for lifting the desired portion of the vehicle through the use of any power lifting means.

It is, of course, to be understood that the device is designed to cooperate with axles of any type and that the use of a single bar A in place of the pair of bars described and shown would be equally effective for some uses, and hence in so far as the scope of the appended claims may permit the use of a single bar in place of the pair of bars described is contemplated.

What I claim to be new is:

1. A lift for automobiles and the like, comprising bars connected at their forward ends and rearwardly divergent, said bars including rearwardly extending parallel portions at the ends of the divergent portions, such parallel portions being designed to underlie and provide supporting means for the axle of the vehicle and being terminally formed as upstanding forwardly directed hooks having their upper surfaces downwardly and forwardly inclined to wedge beneath the rear upper flange of the vehicle axle, a single plate slidably supported on both bars with its forward portion resting on the bars and its rear portion spaced from the upper surface of the bars, the rear edge of the plate being substantially in alignment with the hook terminals of the bars, and means for moving the plate toward the hook terminals to thereby wedge such hook terminals in place.

2. A lift for automobiles and the like, comprising bars connected at their forward ends and rearwardly divergent, said bars including rearwardly extending parallel portions at the ends of the divergent portions, such parallel portions being designed to underlie the axle of the vehicle and being terminally formed as upstanding forwardly directed hooks having their upper surfaces downwardly and forwardly inclined to wedge beneath the upper flange of the vehicle axle, a single plate slidably supported on both bars with its forward portion resting on the bars and its rear portion spaced from the upper surface of the bars, the rear edge of the plate being substantially in alignment with the hook terminals of the bars, and a member operating between the bars and having a threaded connection fixed to said bars for operating the plate toward and from the hook terminals.

In testimony whereof I affix my signature.

LOUIS T. BIEGLER.